US008872868B2

(12) United States Patent
Miyagawa et al.

(10) Patent No.: US 8,872,868 B2
(45) Date of Patent: Oct. 28, 2014

(54) DRIVING METHOD OF LIGHT EMITTING DEVICE

(71) Applicant: Semiconductor Energy Laboratory Co., Ltd., Atsugi (JP)

(72) Inventors: Keisuke Miyagawa, Kanagawa (JP); Ryota Fukumoto, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 13/676,171

(22) Filed: Nov. 14, 2012

(65) Prior Publication Data

US 2013/0070001 A1 Mar. 21, 2013

Related U.S. Application Data

(62) Division of application No. 11/229,852, filed on Sep. 20, 2005, now abandoned.

(30) Foreign Application Priority Data

Sep. 24, 2004 (JP) ................................ 2004-278492

(51) Int. Cl.

*G09G 5/10* (2006.01)
*G06F 3/041* (2006.01)
*G09G 3/32* (2006.01)
*G09G 3/20* (2006.01)

(52) U.S. Cl.

CPC ........ *G09G 3/3291* (2013.01); *G09G 2310/061* (2013.01); *G09G 2300/0809* (2013.01); *G09G 2300/0842* (2013.01); *G09G 2320/0252* (2013.01); *G09G 2300/0861* (2013.01); *G09G 2320/0233* (2013.01); *G09G 2310/0256* (2013.01); *G09G 3/2022* (2013.01); *G09G 2320/043* (2013.01)

USPC .......................................... 345/690; 345/178

(58) Field of Classification Search

USPC .......... 345/76, 77, 213, 87, 92, 217, 218, 212

See application file for complete search history.

(56) References Cited

U.S. PATENT DOCUMENTS 6,362,835 B1 3/2002 Urbanus et al.
7,250,931 B2 7/2007 Tanada et al.

(Continued)

FOREIGN PATENT DOCUMENTS

CN 1450509 A 10/2003
EP 1429312 A2 6/2004

(Continued)

OTHER PUBLICATIONS

Office Action (Chinese Application No. 200510106425.1) with English translation, 14 pages, mailed Mar. 7, 2008.

*Primary Examiner* — Michael Faragalla
(74) *Attorney, Agent, or Firm* — Fish & Richardson P.C.

(57) ABSTRACT

If a potential of a gate electrode of a driving transistor varies after a gray scale signal is inputted into each pixel, a current value of a current supplied to a light emitting element varies so that accurate gray scale display cannot be obtained. In particular, in the case of performing black display, current may flow, which makes clear black display difficult. Accordingly, the invention provides a light emitting device capable of performing accurate gray scale display, and a driving method thereof. According to the invention, a signal for display is inputted plural times within a predetermined timing period, or a writing operation period is lengthened. Consequently, the gate voltage of the transistor is determined after the anode potential of the light emitting element is stabilized, and therefore accurate gray scale display can be performed.

9 Claims, 13 Drawing Sheets

(56) References Cited

U.S. PATENT DOCUMENTS

| | | | |
|---|---|---|---|
| 7,259,735 | B2 | 8/2007 | Kasai |
| 7,429,985 | B2 | 9/2008 | Kimura et al. |
| 7,456,810 | B2 * | 11/2008 | Kimura ........................... 345/76 |
| 7,999,770 | B2 | 8/2011 | Kasai |
| 2001/0022565 | A1 | 9/2001 | Kimura |
| 2003/0090447 | A1 | 5/2003 | Kimura |
| 2007/0257867 | A1 | 11/2007 | Kasai |
| 2007/0268286 | A1 | 11/2007 | Tanada et al. |
| 2008/0007499 | A1 | 1/2008 | Kawabe |
| 2008/0007546 | A1 | 1/2008 | Kawabe |
| 2009/0009676 | A1 | 1/2009 | Kimura et al. |
| 2009/0096727 | A1 | 4/2009 | Kimura |
| 2011/0205144 | A1 | 8/2011 | Kimura et al. |
| 2011/0205215 | A1 | 8/2011 | Kimura |

FOREIGN PATENT DOCUMENTS

| | | | |
|---|---|---|---|
| EP | 1870875 | A2 | 12/2007 |
| JP | 2001-343933 | A | 12/2001 |
| JP | 2003-202833 | A | 7/2003 |
| JP | 2003-223138 | A | 8/2003 |
| JP | 2004-191752 | A | 7/2004 |
| JP | 2005-326793 | A | 11/2005 |
| WO | WO 2005/116970 | A1 | 12/2005 |

* cited by examiner

DRIVING METHOD OF LIGHT EMITTING DEVICE

CROSS-REFERENCE TO RELATED APPLICATIONS

This application is a divisional of U.S. application Ser. No. 11/229,852, filed Sep. 20, 2005, which claims the benefit of a foreign priority application filed in Japan as Serial No. 2004-278492 on Sep. 24, 2004, both of which are incorporated by reference.

BACKGROUND OF THE INVENTION

1. Field of the Invention

The present invention relates to a configuration for performing accurate gray scale display in a display device having a light emitting element (a light emitting device), and a driving method thereof.

2. Description of the Related Art

In a conventional light emitting device, a pixel configuration as shown in FIG. 9 has been proposed in which a switching element 810 whose on/off is controlled by a video signal inputted from a signal line 814, a transistor 811 for driving a light emitting element 813, and a capacitor 812 provided between a power source line 815 and a gate electrode of the transistor 811 to hold a gate-source voltage of the transistor 811 (see Patent Document 1) are provided.

[Patent Document 1] Japanese Patent Laid-Open No. 2001-343933

It is considered that an equivalent circuit of a light emitting element described in Patent Document 1 can be shown by a parallel circuit including a diode 816 and a capacitor ($C_{EL}$) in FIG. 9. Operation in the case where a current value of a current supplied to the light emitting element 813 varies is described below with reference to FIG. 9.

First, it is assumed that a current at a current value $I_0$ flows constantly into the light emitting element 813. Then, in the case where the current value of the current flowing into the light emitting element 813 increases from $I_0$ to $I_1$, a current value of a current flowing into the diode 816 does not become $I_1$ immediately. This is because an increased amount of the current value of the light emitting element 813 is equal to a sum of an increased amount of the current value of the current flowing into the diode 816 and a current value of a current flowing into the capacitor ($C_{EL}$). Therefore, the current value of the current flowing into the diode 816 becomes equal to $I_1$ when the charging of the capacitor ($C_{EL}$) is completed.

Meanwhile, assuming that the current at the current value $I_0$ flows constantly into the light emitting element 813 and then the current value decreases from $I_0$ to $I_2$, a sum of the current value of the current flowing into the diode 816 and a current value of a current discharged from the capacitor ($C_{EL}$) becomes $I_2$. The current value of the current flowing into the diode 816 becomes equal to $I_2$ when the discharging of the capacitor ($C_{EL}$) is completed. In the above-described cases, the time until which the current value of the constant current flowing into the diode 816 changes is equal to the time until which changing of a potential between an anode and a cathode of the light emitting element 813 is completed, which becomes longer as the size of the capacitor ($C_{EL}$) is larger and as the changed amount of the current value of the light emitting element 813 is larger.

The pixel circuit shown in FIG. 9 further includes overlap capacitance ($C_{gd}$) between a gate electrode and a drain electrode of the driving transistor 811 and parasitic capacitance ($C_p$) caused by overlap between the gate electrode and the anode and the like depending on the layout in addition to the capacitor ($C_{EL}$) between both the electrodes of the light emitting element 813.

At this time, the switching element 810 is turned on, and a current corresponding to a gray scale signal inputted into the gate of the transistor 811 is supplied to the light emitting element 813 and an anode potential thereof changes. However, when the capacitor ($C_{EL}$) of the light emitting element 813 is large and a changed amount of the current value of the current supplied to the light emitting element 813 is large, it takes a long time to complete the charging/discharging of the capacitor ($C_{EL}$) and complete the changing of the anode potential. Therefore, there is a case where the changing of the anode potential does not complete in the on-period of the switching element 810.

Then, in the case where the anode potential of the light emitting element 813 changes (a value of change is $\Delta V_A$) after the switching element 810 is turned off in FIG. 9, the potential of the gate electrode of the transistor 811 changes due to capacitive coupling of the parasitic capacitance ($C_p$), the overlap capacitance ($C_{gd}$), and the capacitor ($C_S$) 812. A value of change at this time, $\Delta V_B$ is expressed by $\Delta V_B=(C_P+C_{gd})/(C_P+C_{gd}+C_S)\times\Delta V_A$.

As set forth above, in the case where the potential of the gate electrode of the transistor 811 changes after a gray scale signal is inputted into each pixel, there is a problem in that the current value of the current supplied to the light emitting element 813 changes so that accurate gray scale display cannot be obtained. In particular, in the case of performing black display, a current may flow into the light emitting element so that clear black display cannot be easily performed.

SUMMARY OF THE INVENTION

It is an object of the invention to provide a light emitting device capable of performing accurate gray scale display and a driving method thereof.

In view of the foregoing problem, according to the invention, a signal for display is inputted plural times within a predetermined timing period, or a writing operation period thereof is lengthened. As a result, the gate voltage is determined after the anode potential of the light emitting element is stabilized, so that accurate gray scale display can be performed.

A specific mode of the invention is a driving method of a light emitting device, in which one frame period is divided into a plurality of subframe periods SF1, SF2, . . . , and SFn (n is a positive integer), each subframe period SFn has a writing operation period Ta, and the period Te for inputting an erasing signal is provided plural times in at least one subframe period.

Another mode of the invention is a driving method of a light emitting device, in which one frame period is divided into a plurality of subframe periods SF1, SF2, . . . , and SFn (n is a positive integer), each subframe period SFn has a writing operation period Ta, and the writing operation period Ta is provided plural times in at least one subframe period.

Another mode of the invention is a driving method of a light emitting device for performing gray scale display by inputting a video signal and an erasing signal formed of a digital signal, in which a period for inputting the erasing signal is provided longer than a period for inputting the video signal.

A pixel configuration of such a light emitting device comprises a switching transistor having a source electrode or a drain electrode connected to a signal line and a gate electrode connected to a scan line, a driving transistor having a gate electrode connected to the switching transistor, and a light emitting element which is connected to a source electrode or a drain electrode of the driving transistor.

In addition, the pixel configuration may additionally include an erasing transistor for discharging a charge corresponding to a gate-source voltage of the driving transistor.

In addition, the pixel configuration may further additionally include a transistor which is connected to the driving transistor in series and the gate potential of which is fixed.

According to the driving method of the invention, a light emitting device capable of performing accurate gray scale display can be provided.

DETAILED DESCRIPTION OF THE INVENTION

Figure 1A:
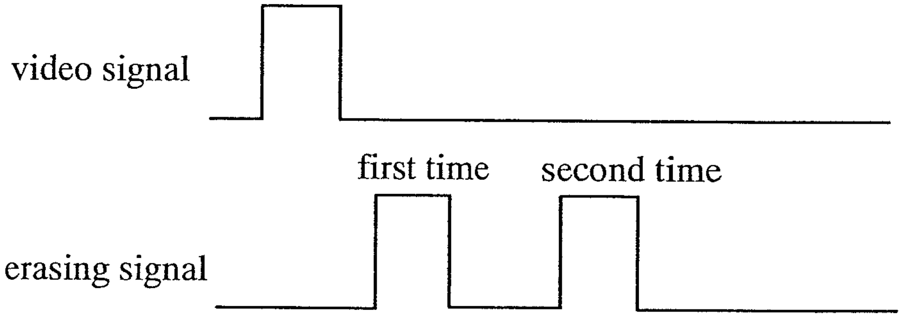
FIGS. 1A and 1B are diagrams each showing a driving method of the invention.

Although the invention will be fully described by way of embodiment modes and an embodiment with reference to the accompanying drawings, it is to be understood that various changes and modifications will be apparent to those skilled in the art. Therefore, unless such changes and modifications depart from the scope of the invention, they should be construed as being included therein. In the drawings for describing embodiment modes and an embodiment, the same portions or portions having the same function are denoted by the same reference numerals, and the description thereof is not repeated.

Embodiment Mode 1

This embodiment mode describes a driving method in the case where a predetermined signal is inputted plural times.

In FIG. 1A, operation in the case where an erasing signal is inputted two times in a digital gray scale method is shown. First, at a predetermined timing, a digital signal for display (a video signal) is inputted, and then a first erasing signal is inputted after a predetermined time has passed. At this time, if the capacitor ($C_{EL}$) or the parasitic capacitance ($C_p$) exists, a potential of a gate electrode (a gate potential) of a driving transistor does not relatively become 0 only by the first erasing signal so that off operation cannot be performed; as a result, it is difficult to perform accurate gray scale display and gray scale deviation occurs. In view of this, according to the invention, the erasing signal is inputted again, that is, a second erasing signal is inputted after a predetermined time has passed. Accordingly, the gate potential can be relatively made 0 again so that off operation can be performed. As a result, the gray scale deviation is reduced and accurate gray scale display can be performed.

It is to be noted that although the erasing signal is inputted two times in FIG. 1A, it may be inputted three or more times. Instead of an erasing signal, the same video signal may be inputted two or more times as well.

Figure 1B:
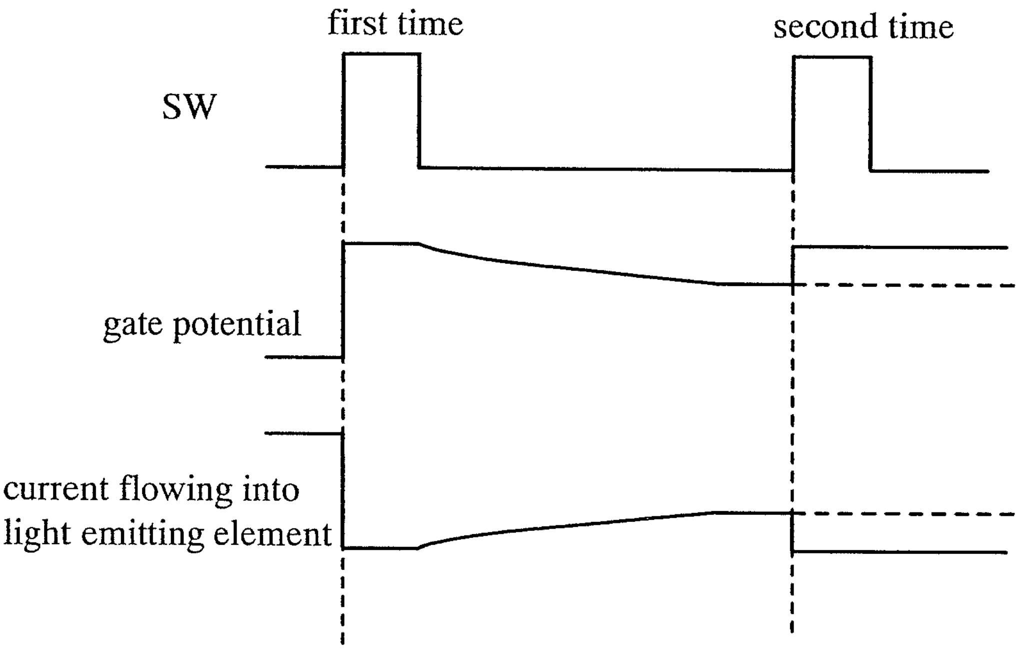

Shown in FIG. 1B are a gate potential of the driving transistor and a current flowing into the light emitting element in the case where an analog signal for display (a gray scale signal) is inputted two times in an analog gray scale method. A dotted line shows a state in the case where the gray scale signal is inputted one time as is conventional.

First, a first gray scale signal (SW) is inputted and the gate potential of the driving transistor becomes a predetermined value. At this time, if the capacitor ($C_{EL}$) exists, the gate potential gradually decreases. As a result of this and due to the parasitic capacitance ($C_p$), the current flowing into the light emitting element is not maintained at a predetermined value but increased gradually; as a result, the current flowing into the light emitting element is maintained at a high value as shown by the dotted line so that gray scale deviation occurs. In view of this, according to the invention, the gray scale signal is inputted again, that is, a second gray scale signal is inputted after a predetermined time has passed. Accordingly, the gate potential of the driving transistor returns to the predetermined value and the current flowing into the light emitting element also becomes at the predetermined value.

Note that since the anode potential of the light emitting element is stabilized to a certain extent when the second gray scale signal is inputted, the gate potential of the driving transistor changes less after that and thus the current flowing into the light emitting element increases less.

Although the gray scale signal is inputted two times in FIG. 1B, the invention is not limited to this and the gray scale signal may be inputted more than two times.

As set forth above, by the driving method for inputting a predetermined signal such as an erasing signal and a gray scale signal plural times, a light emitting device capable of performing accurate gray scale display can be provided.

Embodiment Mode 2

Described in this embodiment mode is a timing chart of a digital gray scale method in the case where a period for inputting a video signal and a period for inputting an erasing signal plural times are provided.

Figures 2A, 2B:
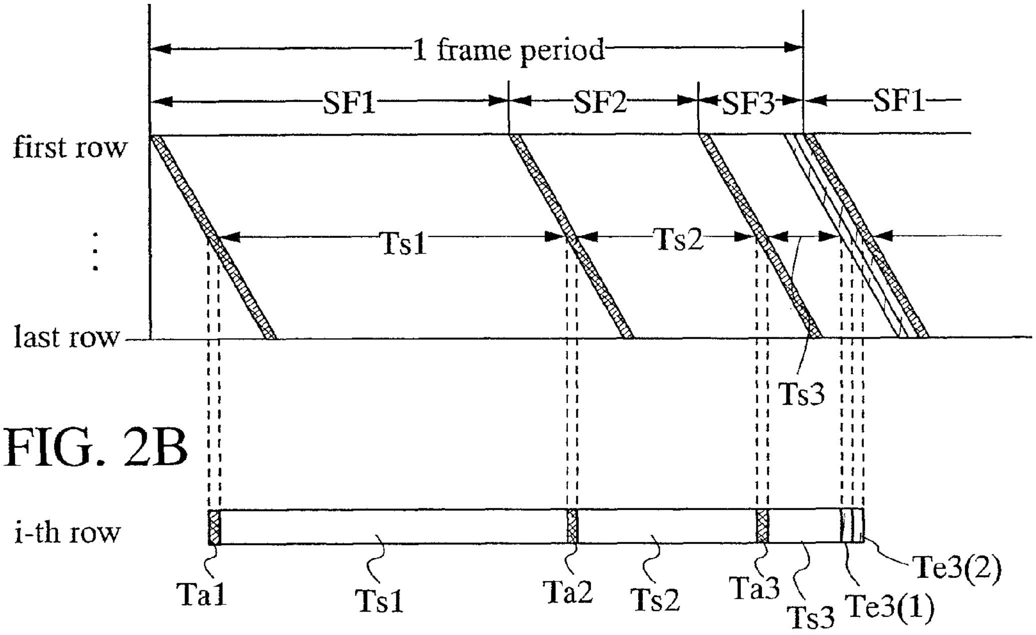
FIGS. 2A and 2B are diagrams showing a timing chart of the invention.

One frame period can be divided into a plurality of subframe periods SF1, SF2, . . . , and SFn (n is a positive integer). FIG. 2A is a timing chart in the case where one frame period is divided into three subframe periods (SF1, SF2, and SF3) to perform 6-gray scale display, in which an erasing signal is inputted two times in the subframe period SF3. FIG. 2B is a timing chart focusing on a scan line of the i-th row.

The subframe periods (SF1, SF2, and SF3) have writing operation periods for inputting a video signal (Ta1, Ta2, and Ta3) (also referred to as periods for inputting a writing signal) and light emitting periods for performing light emission depending on the written video signal (Ts1, Ts2, and Ts3) respectively. The length of the light emitting periods is set to satisfy Ts1:Ts2:Ts3=$2^2:2^1:2^0$.

In the shortest subframe period SF3, periods for inputting an erasing signal two times Te3(1) and Te3(2) are provided. By providing the periods for inputting an erasing signal two times Te3(1) and Te3(2), the gate potential of the driving transistor can be accurately determined even if the capacitor ($C_{EL}$) exists. Accordingly, accurate gray scale display can be performed.

It is to be noted that by inputting an erasing signal in the subframe period SF3, input of a writing signal in the subframe period SF1 of the next frame can immediately start, which leads to a high duty ratio.

The driving method in this embodiment mode can be realized by using a pixel circuit including an erasing transistor for discharging a charge corresponding to a gate-source voltage of the driving transistor. For example, a pixel circuit shown in FIG. 5B which is described later can be used.

Note that although the two periods for inputting an erasing signal are provided in the subframe period SF3 in this embodiment mode, the invention is not limited to this; for example, three or more periods for inputting the erasing signal may be provided and such a period may be provided in the period other than the subframe period SF3. Alternatively, a plurality of the writing operation periods may be provided in order to input the same writing signal plural times. That is, according to the invention, the difficulty in performing accurate gray scale display due to the capacitor ($C_{EL}$) is solved by providing a plurality of inputting periods for inputting a predetermined signal plural times.

Embodiment Mode 3

Described in this embodiment mode is a timing chart of a digital gray scale method in the case where a plurality of writing operation periods (also referred to as periods for inputting a writing signal) is provided.

Figures 3A, 3B:
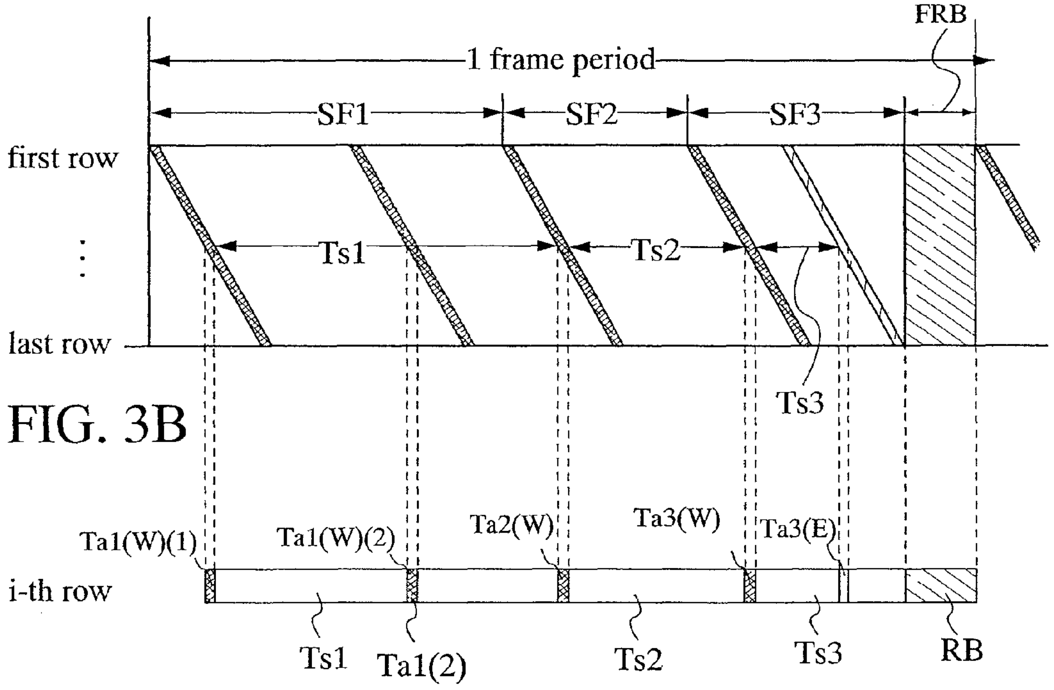
FIGS. 3A and 3B are diagrams showing a timing chart of the invention.

One frame period can be divided into a plurality of subframe periods SF1, SF2, . . . , and SFn (n is a positive integer). FIG. 3A is a timing chart in the case where one frame period is divided into three subframe periods (SF1, SF2, and SF3) to perform 6-gray scale display, in which a period for applying a reverse voltage is provided. FIG. 3B is a timing chart focusing on a scan line of the i-th row.

The subframe periods (SF1, SF2, and SF3) include writing operation periods (Ta1(W), Ta2(W), and Ta3(W)) and light emitting periods for performing light emission depending on the written signal (Ts1, Ts2, and Ts3) respectively. The length of the light emitting periods is set to satisfy Ts1:Ts2:Ts3=$2^2$:$2^1$:$2^0$. In the shortest subframe period SF3, a period for inputting an erasing signal (Ta3(E)) is provided. The written signal is erased in the period for inputting an erasing signal.

In the longest subframe period SF1, for example, two writing operation periods Ta1 are provided (referred to as Ta1(1) and Ta1(2), respectively). In the periods Ta1(1) and Ta1(2), periods for inputting a video signal Ta1(W)(1) and Ta1(W)(2) are provided. The video signal is written in the first writing operation period Ta1(1) (referred to as a period Ta1(W)(1)), and the video signal is also written in the second writing operation period Ta1(2) (referred to as a period Ta1(W)(2)). In this manner, the video signal can be written plural times. Accordingly, the gate potential of the driving transistor can be accurately controlled even if the capacitor ($C_{EL}$) exists.

The driving method in this embodiment mode can be realized without an erasing transistor for discharging a charge corresponding to a gate-source voltage of the driving transistor. A high aperture ratio of a pixel portion can be obtained because the erasing transistor is not required. For example, a pixel circuit shown in FIG. 5A which is described later can be used in a pixel portion. However, a driver circuit for providing a writing operation period Ta(W) and a period for inputting an erasing signal Ta(E) is required.

In a period for applying a reverse voltage (FRB), a reverse voltage is applied to a light emitting element (RB). Before the period for applying a reverse voltage, a period for inputting the erasing signal (Ta(E)) is provided in which data written in the subframe period immediately before the period for inputting the erasing signal, namely in SF3 in this embodiment mode is sequentially erased. This is because since the reverse voltage is applied to all the light emitting elements at the same time, some elements may emit light when the reverse voltage is applied if the data remains. By applying such a reverse voltage to the light emitting element, a defect state of the light emitting element can be improved and the reliability thereof can be improved. The light emitting element, in particular, may have an initial defect that an anode and a cathode thereof are short-circuited due to adhesion of foreign substances, some pinholes that are produced by minute projections of the anode or the cathode, or nonuniformity of an electroluminescent layer thereof. When such an initial defect occurs, light emission/non-light emission in accordance with a signal is not performed and almost all currents flow into the short-circuited portion. Consequently, favorable image display cannot be performed. In addition, such a defect may occur in an arbitrarily pixel.

As according to this embodiment mode, by applying a reverse voltage to the light emitting element, a current flowing locally into the short-circuited portion generates heat to oxidize or carbonize the short-circuited portion. As a result, the short-circuited portion can be insulated and a current flows into the region other than the insulated portion so that normal operation as the light emitting element can be obtained. By applying a reverse voltage, the initial defect can be resolved as described above. Note that the insulation of the short-circuited portion is preferably performed before shipping.

Further, not only an initial defect, but another defect might occur with time in which the anode and the cathode are short-circuited. Such a defect is also called a progressive defect. However, as according to this embodiment mode, by applying a reverse voltage to the light emitting element regularly, the progressive defect can also be resolved and normal operation can be performed.

Furthermore, applying a reverse voltage can also prevent image burn-in. The image burn-in occurs depending on the degradation state of a light emitting element; the degradation state can be reduced by applying a reverse voltage. Therefore, image burn-in can be prevented.

Such a degradation progresses largely in the initial stage; the progress speed of degradation decreases with time. That is, a once-degraded light emitting element is less easily degraded with time. As a result, a light emitting element which has degraded in the initial stage and a light emitting element which has degraded with time are mixed, and variation occurs in the degradation states of the light emitting elements. In view of this, by making all light emitting elements emit light before shipping, when an image is not displayed or the like, the light emitting element which has not degraded in the initial stage yet is degraded, by which the degradation states can be averaged. Constitution for making all light emitting elements emit light as described above may be additionally provided in the light emitting device.

It is to be noted that the period for applying a reverse voltage is not limited to that shown in FIGS. 3A and 3B; for example, the period may be provided at the start of one frame period. In addition, the period for applying a reverse voltage is not necessarily required to be provided in each frame period.

The period for applying a reverse voltage may be provided in the case of the timing chart shown in FIGS. 2A and 2B as well.

Although two writing operation periods are provided in the subframe period SF1 in this embodiment mode, the invention is not limited to this; for example, more than two writing operation periods may be provided. In addition, a plurality of writing operation periods may be provided in another subframe period. That is, according to the invention, the difficulty in performing accurate gray scale display due to the capacitor ($C_{EL}$) is solved by providing a plurality of periods for inputting a predetermined signal.

Figures 13A, 13B:
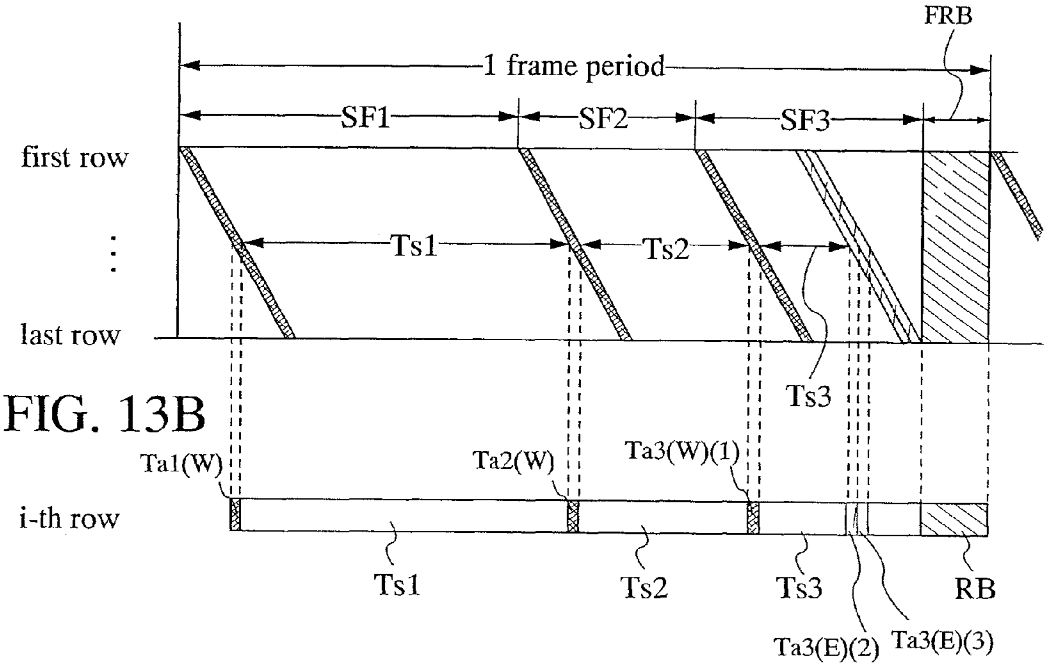
FIGS. 13A and 13B are diagrams showing a timing chart of the invention.

FIGS. 13A and 13B is a timing chart in the case where a plurality of periods for inputting an erasing signal Ta(E), for example two periods, are provided.

FIG. 13A is a timing chart in the case where one frame period is divided into three subframe periods (SF1, SF2, and SF3) to perform 6-gray scale display, in which a period for applying a reverse voltage is provided. FIG. 13B is a timing chart focusing on a scan line of the i-th row.

The subframe periods (SF1, SF2, and SF3) include writing operation periods (Ta1(W), Ta2(W), and Ta3(W)) and light emitting periods for performing light emission depending on the written signal (Ts1, Ts2, and Ts3) respectively. The length of the light emitting periods is set to satisfy Ts1:Ts2:Ts3=$2^2$:$2^1$:$2^0$.

In the shortest subframe period SF3, a video signal is inputted in the writing operation period Ta3(W) and a erasing signal is inputted in the two periods for inputting the erasing signal Ta3(E)(2) and Ta3(E)(3). Accordingly, the gate potential of the driving transistor can be accurately controlled even if the capacitor ($C_{EL}$) exists.

By providing a period for applying a reverse voltage to the light emitting element in FIGS. 13A and 13B similarly to FIGS. 3A and 3B, the progressive defect can be resolved as describe above.

Embodiment Mode 4

Described in this embodiment mode is a driving method in the case where time for inputting a predetermined signal is lengthened.

Figure 4A:
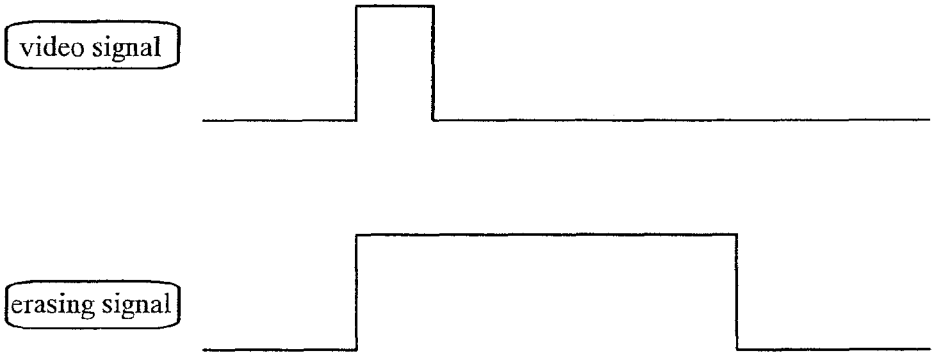
FIGS. 4A and 4B are diagrams each showing a driving method of the invention.

In FIG. 4A, operation of a digital gray scale method in the case where a period for inputting an erasing signal is longer than a period for inputting a video signal is shown. By lengthening the period for inputting an erasing signal, change of the gate potential after a video signal is inputted is suppressed, and besides, micro-light emission of light emitting elements after the erasing operation is performed can be reduced. Consequently, accurate black display can be performed.

Figure 4B:
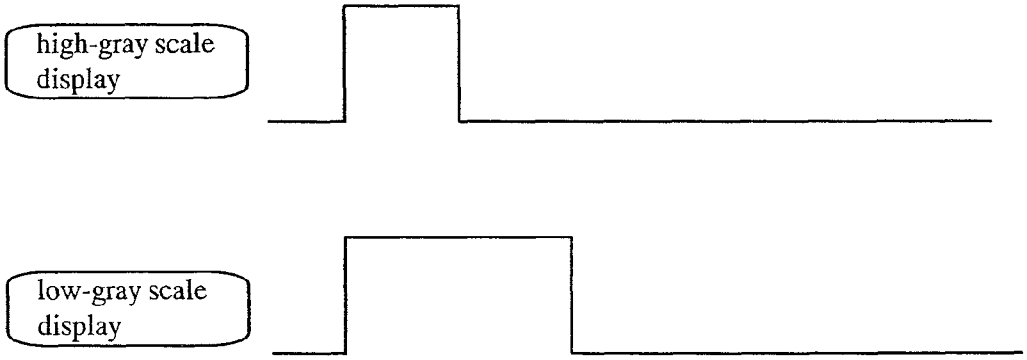

In FIG. 4B, operation of an analog gray scale method in the case where a period for inputting a gray scale signal is lengthened is shown. In particular, in the case of low-gray scale display, presence of the capacitor ($C_{EL}$) affects largely since a current flowing into the light emitting element is small; therefore, the period for inputting a gray scale signal may be preferably longer in the case of low-gray scale display than in the case of high-gray scale display.

It is to be noted that the period for inputting a gray scale signal is determined depending on the frame frequency, the number of pixels, and the number of columns into which the signal is inputted at the same time (hereinafter referred to as the number of parallel columns of writing). The frame frequency and the number of pixels are related to display performance, and as they are larger, the period for inputting a gray scale signal becomes shorter.

The number of parallel columns of writing is related to a hardware structure, and as the number of parallel columns of writing is smaller, the period for inputting a gray scale signal becomes shorter. Note that in a line sequential writing method, the number of parallel columns of writing is equal to the number of horizontal pixels.

As described above, in accordance with increase in the number of pixels due to improvement in the image quality, the period for inputting a gray scale signal becomes shorter.

Meanwhile, a current flowing into a light emitting element is decreased due to improvement in the efficiency of the light emitting element so that the period for inputting a gray scale signal is required to be lengthened.

Accordingly, in the case of low-gray scale display in particular, the period for inputting a gray scale signal is lengthened, which can be achieved by decreasing the frame frequency. Consequently, gray scale deviation is decreased and accurate gray scale display can be performed.

As set forth above, by a driving method in which a period for inputting a predetermined signal is lengthened, a light emitting device for performing accurate gray scale display can be provided.

Embodiment Mode 5

Described in this embodiment mode is a timing chart of a digital gray scale method in the case where time for inputting a predetermined signal is lengthened.

In the case where time for inputting a predetermined signal is lengthened, the timing chart in which one frame period is divided into a plurality of subframe periods as shown in FIGS. 2A and 2B, or the timing chart in which a reverse voltage is applied as shown in FIGS. 3A and 3B can be employed as well.

Figure 11A:
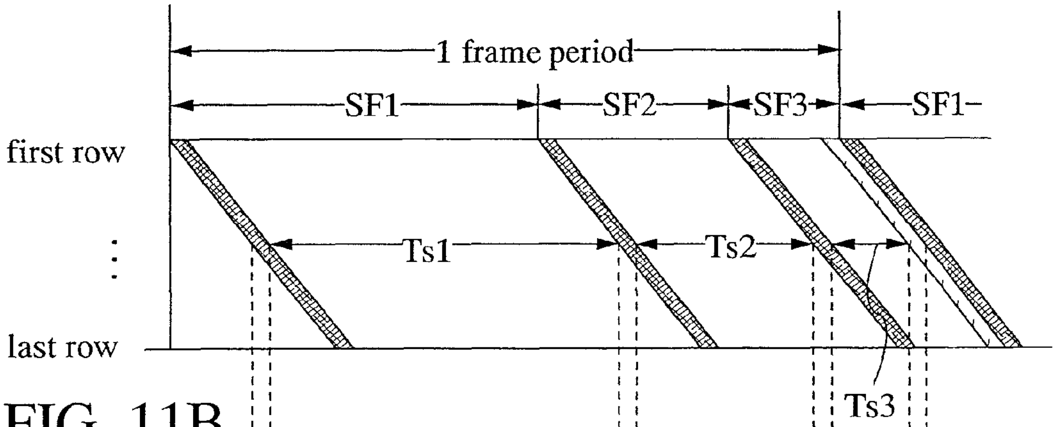
FIGS. 11A and 11B are diagrams showing a timing chart of the invention.
Figure 11B:
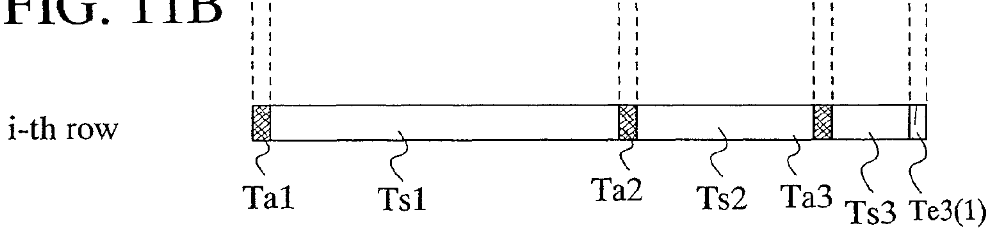
Figures 12A, 12B:
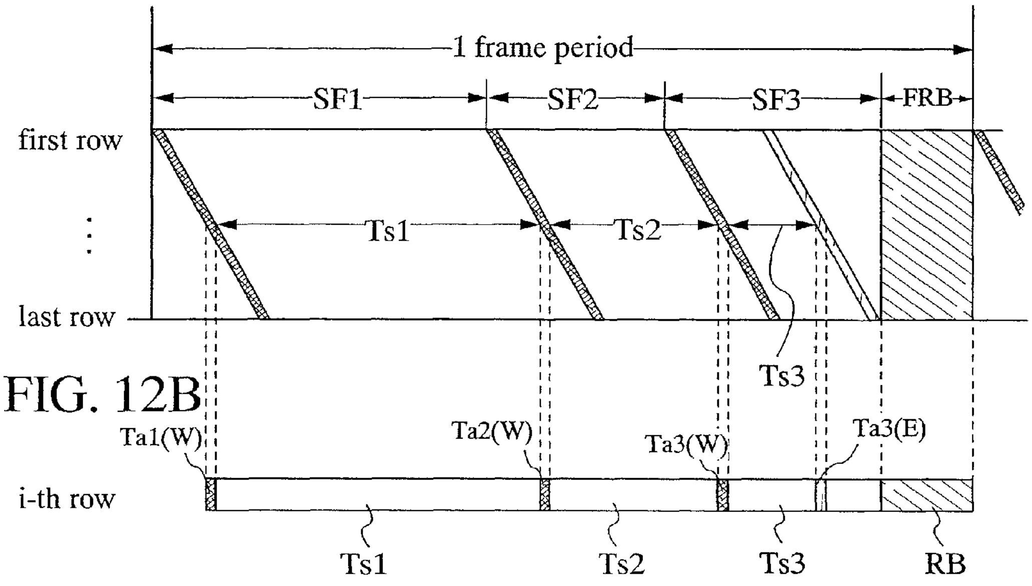
FIGS. 12A and 12B are diagrams showing a timing chart of the invention.

For example, in the timing chart as shown in FIGS. 11A and 11B, one period for inputting an erasing signal Te3(1) is provided in the subframe period SF3 and the period Te3(1) is lengthened (see FIGS. 11A and 11B). Alternatively, for example, in the timing chart as shown in FIGS. 12A and 12B, the writing operation period Ta3(W) and the period for inputting an erasing signal Ta3(E) provided in the subframe period SF3 are lengthened (see FIGS. 12A and 12B).

The other structure of the timing chart in this embodiment mode is the same as those in FIGS. 2A and 2B and FIGS. 3A and 3B, and therefore, description thereof is omitted here.

Embodiment Mode 6

In this embodiment mode, an equivalent circuit diagram of a pixel included in a light emitting device of the invention is described with reference to FIGS. 5A to 5C.

Figure 5A:
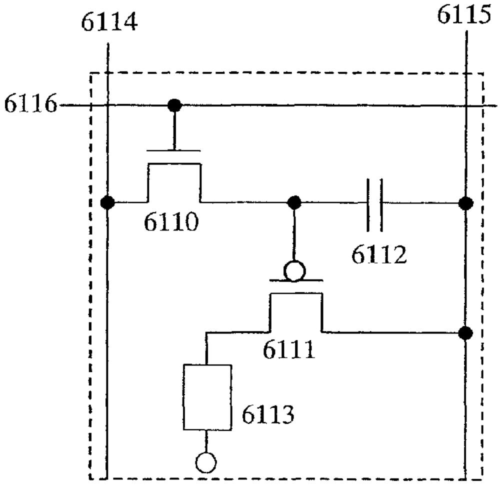
FIGS. 5A to 5C are diagrams each showing a pixel circuit of the invention.

FIG. 5A is an example of an equivalent circuit diagram of a pixel, which includes a signal line 6114, a power supply line 6115, a scan line 6116, a light emitting element 6113, a switching transistor 6110, a driving transistor for driving the light emitting element 6111, and a capacitor 6112. The signal line 6114 is inputted with a video signal by a signal line driver circuit. On/off of the switching transistor 6110 is controlled by the video signal. The switching transistor 6110 can control supply of potential of the video signal to a gate of the driving transistor 6111 in accordance with a selection signal inputted into the scan line 6116. The driving transistor 6111 can control current supply to the light emitting element 6113 in accordance with the potential of the video signal. The capacitor 6112 can hold a gate-source voltage of the driving transistor 6111. It is to be noted that although the capacitor 6112 is provided in FIG. 5A, it is not required to be provided if the gate capacitance of the driving transistor 6111 or other parasitic capacitance can substitute.

Figure 5B:
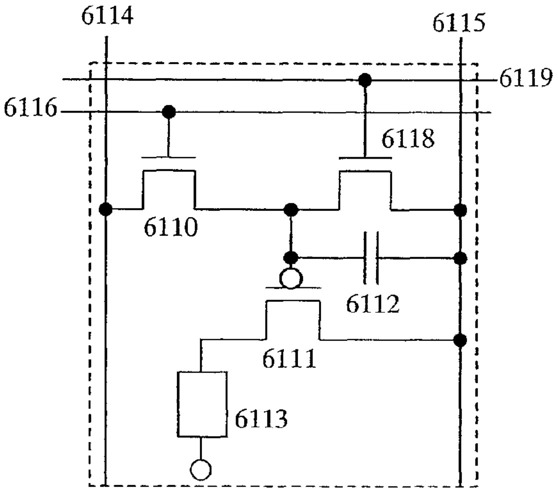

FIG. 5B is an equivalent circuit diagram of a pixel in which an erasing transistor 6118 and a scan line 6119 are additionally provided in the pixel shown in FIG. 5A. By the erasing transistor 6118, respective potential of a gate and a source of the transistor 6111 can be equal to each other to make no current flow into the light emitting element 6113 forcibly. Therefore, a subframe period can be shorter than a period for inputting a video signal into all pixels. Consequently, the duty ratio can be improved.

Figure 5C:
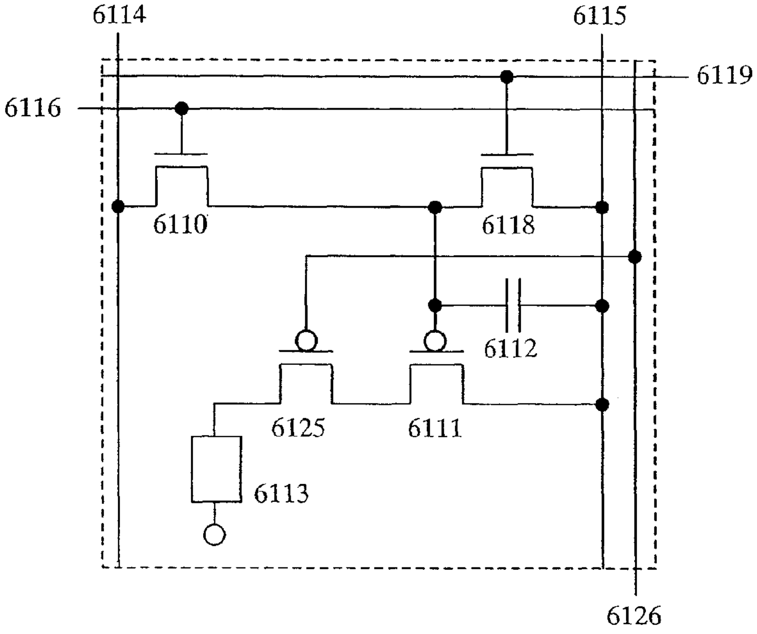

FIG. 5C is an equivalent circuit diagram of a pixel in which a transistor 6125 and a wiring 6126 are additionally provided in the pixel shown in FIG. 5B. Gate potential of the transistor 6125 is fixed by the wiring 6126. In addition, the driving transistor 6111 and the transistor 6125 are connected in series between the power source line 6115 and the light emitting element 6113. Therefore, in FIG. 5C, the transistor 6125 controls the amount of current supplied to the light emitting element 6113 while the driving transistor 6111 controls whether the current is supplied or not to the light emitting element 6113.

It is to be noted that a configuration of a pixel circuit in the light emitting device of the invention is not limited to those described in this embodiment mode. This embodiment mode can be freely combined with the above-described embodiment modes.

Embodiment Mode 7

In this embodiment mode, a sectional structure of a pixel in which a driving transistor is a p-channel thin film transistor (TFT) is described with reference to FIGS. 6A to 6C. Note that, in the invention, one of an anode and a cathode of a light emitting element, of which the potential can be controlled by a transistor is referred to as a first electrode, and the other is referred to as a second electrode. Although description is made on the case where the first electrode is the anode and the second electrode is the cathode in FIGS. 6A to 6C, it is possible that the first electrode is the cathode and the second electrode is the anode as well.

Figure 6A:
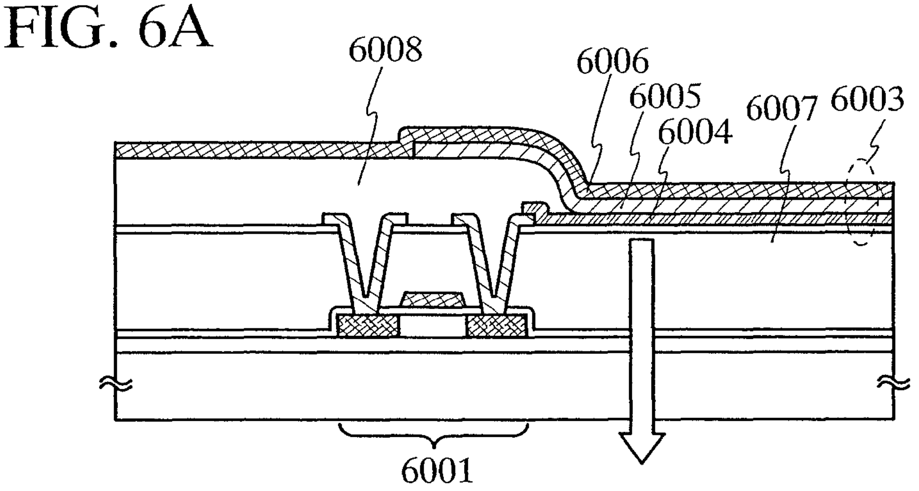
FIGS. 6A to 6C are cross-sectional views each showing a pixel structure of the invention.

FIG. 6A is a sectional view of a pixel in which a TFT 6001 is a p-type and light emitted from a light emitting element 6003 is extracted from a first electrode 6004 side. The first electrode 6004 of the light emitting element 6003 is electrically connected to the TFT 6001 in FIG. 6A.

The TFT 6001 is covered with an interlayer insulating film 6007, and a bank 6008 having an opening is formed over the interlayer insulating film 6007. In the opening of the bank 6008, the first electrode 6004 is partially exposed, and the first electrode 6004, an electroluminescent layer 6005 and a second electrode 6006 are stacked in this order.

The interlayer insulating film 6007 can be formed by using an organic resin film, an inorganic insulating film, or an insulating film containing siloxane as a starting material and having Si—O—Si bonds (hereinafter referred to as a “siloxane insulating film”) Siloxane corresponds to a resin having Si—O—Si bonds. Siloxane is composed of a skeleton formed by the bond of silicon (Si) and oxygen (O), in which an organic group containing at least hydrogen (such as an alkyl group or aromatic hydrocarbon) is included as a substituent. Alternatively, a fluoro group may be used as the substituent. Further alternatively, a fluoro group and an organic group containing at least hydrogen may be used as the substituent. The interlayer insulating film 6007 may also be formed using a so-called low dielectric constant material (low-k material).

The bank 6008 can be formed by using an organic resin film, an inorganic insulating film, or a siloxane insulating film. In the case of an organic resin film, for example, acrylic, polyimide, polyamide, or the like can be used. In the case of an inorganic insulating film, silicon oxide, silicon nitride oxide, or the like can be used. Preferably, the bank 6008 is formed by using a photosensitive organic resin film and has an opening on the first electrode 6004 which is formed such that the side face thereof has a slope with a continuous curvature, which can prevent the first electrode 6004 and the second electrode 6006 from being connected to each other.

The first electrode 6004 is formed by using a material or with a thickness to transmit light, and by using a material suitable for being used as an anode. For example, the first electrode 6004 can be formed by using a light-transmissive conductive oxide such as indium tin oxide (ITO), zinc oxide (ZnO), indium zinc oxide (IZO), and gallium-doped zinc oxide (GZO). Alternatively, the first electrode 6004 may be formed by using indium tin oxide containing silicon oxide (hereinafter referred to as ITSO) or a mixture of indium oxide containing silicon oxide and 2 to 20 atomic % of zinc oxide (ZnO). Further alternatively, other than the aforementioned light-transmissive conductive oxide, the first electrode 6004 may be formed by using, for example, a single-layer film of one or more of TiN, ZrN, Ti, W, Ni, Pt, Cr, Ag, Al and the like, a stacked-layer structure of a titanium nitride film and a film mainly containing aluminum, or a three-layer structure of a titanium nitride film, a film mainly containing aluminum and a titanium nitride film; however, when employing a material other than the light-transmissive conductive oxide, the first electrode 6004 is formed thick enough to transmit light (preferably about 5 to 30 nm).

The second electrode 6006 is formed by using a material or with a thickness to reflect or shield light, and can be formed by using a metal, an alloy, an electrically conductive compound each having a low work function, or a mixture of them. Specifically, an alkali metal such as Li and Cs, an alkaline earth metal such as Mg, Ca and Sr, an alloy containing such metals (Mg:Ag, Al:Li, Mg:In, or the like), a compound of such metals (calcium fluoride such as $CaF_2$ or calcium nitride such as $Ca_3N_2$), or a rare-earth metal such as Yb and Er can be employed. In the case where an electron injection layer is provided, a conductive layer such as an Al layer can be employed as well.

The electroluminescent layer 6005 is structured by a single layer or a plurality of layers. In the case of a plurality of layers, the layers can be classified into a hole injection layer, a hole transporting layer, a light emitting layer, an electron transporting layer, an electron injection layer and the like in terms of the carrier transporting property. When the electroluminescent layer 6005 has any of the hole injection layer, the hole transporting layer, the electron transporting layer and the electron injection layer in addition to the light emitting layer, the hole injection layer, the hole transporting layer, the light emitting layer, the electron transporting layer and the electron injection layer are stacked in this order on the first electrode 6004. Note that the boundary between the layers is not necessarily distinct, and the boundary may not be distinguished clearly since the materials forming the respective layers are partially mixed. Each of the layers can be formed by using an organic material or an inorganic material. As for an organic material, any of the high, medium and low molecular weight materials can be employed. Note that the medium molecular weight material means a low polymer in which the repeated number of structural units (the degree of polymerization) is about 2 to 20. There is no clear distinction between the hole injection layer and the hole transporting layer, and the hole transporting property (hole mobility) is particularly significant in both of them. The hole injection layer is in contact with the anode while a layer in contact with the hole injection layer is called a hole transporting layer to be distinguished for convenience. The same can be applied to the electron transporting layer and the electron injection layer; a layer in contact with the cathode is called an electron injection layer while a layer in contact with the electron injection layer is called an electron transporting layer. The light emitting layer may additionally have a function of the electron transporting layer, and thus may be called a light emitting electron transporting layer.

In the pixel shown in FIG. 6A, light emitted from the light emitting element 6003 can be extracted from the first electrode 6004 side as shown by a hollow arrow.

Figure 6B:
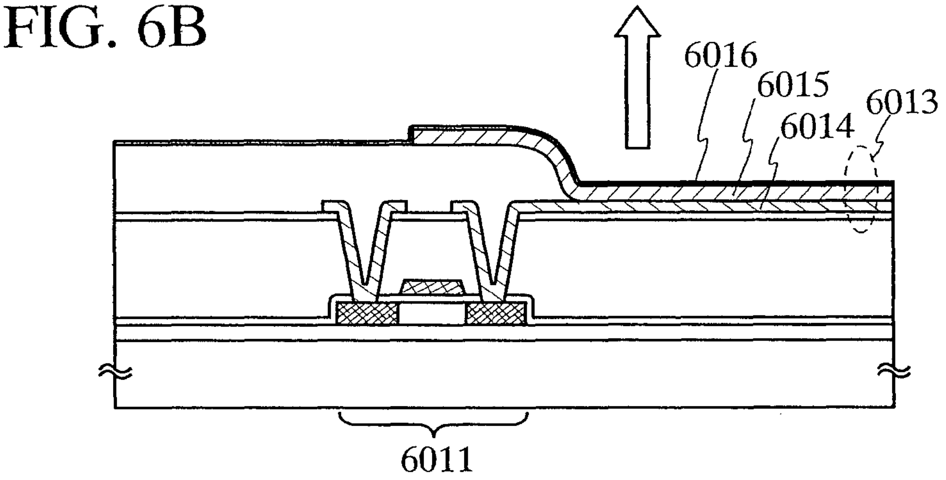

Next, FIG. 6B is a sectional view of a pixel in which a TFT 6011 is a p-type and light emitted from a light emitting element 6013 is extracted from a second electrode 6016 side. A first electrode 6014 of the light emitting element 6013 is electrically connected to the TFT 6011 in FIG. 6B. On the first electrode 6014, an electroluminescent layer 6015 and the second electrode 6016 are stacked in this order.

The first electrode 6014 is formed by using a material or with a thickness to reflect or shield light, and formed by using a material suitable for being used as an anode. For example, the first electrode 6014 may be formed by using a single-layer film of one or more of TiN, ZrN, Ti, W, Ni, Pt, Cr, Ag, Al and the like, a stacked-layer structure of a titanium nitride film and a film mainly containing aluminum, a three-layer structure of a titanium nitride film, a film mainly containing aluminum and a titanium nitride film, or the like.

The second electrode 6016 is formed by using a material or with a thickness to transmit light, and can be formed by using a metal, an alloy, an electrically conductive compound each having a low work function, or a mixture of them. Specifically, an alkali metal such as Li and Cs, an alkaline earth metal such as Mg, Ca and Sr, an alloy containing such metals (Mg:Ag, Al:Li, Mg:In, or the like), a compound of such metals (calcium fluoride such as $CaF_2$ or calcium nitride such as $Ca_3N_2$), or a rare-earth metal such as Yb and Er can be employed. In the case where an electron injection layer is provided, a conductive layer such as an Al layer can be employed as well. Moreover, the second electrode 6016 is formed thick enough to transmit light (preferably about 5 to 30 nm). Note that the second electrode 6016 may also be formed by using a light-transmissive conductive oxide such as indium tin oxide (ITO), zinc oxide (ZnO), indium zinc oxide (IZO), and gallium-doped zinc oxide (GZO). Further alternatively, indium tin oxide containing silicon oxide (ITSO) or a mixture of indium oxide containing silicon oxide and 2 to 20 atomic % of zinc oxide (ZnO) may be employed; in the case of employing a light-transmissive conductive oxide, an electron injection layer is preferably provided in the electroluminescent layer 6015.

The electroluminescent layer 6015 can be formed similarly to the electroluminescent layer 6005 shown in FIG. 6A.

In the pixel shown in FIG. 6B, light emitted from the light emitting element 6013 can be extracted from the second electrode 6016 side as shown by a hollow arrow.

Figure 6C:
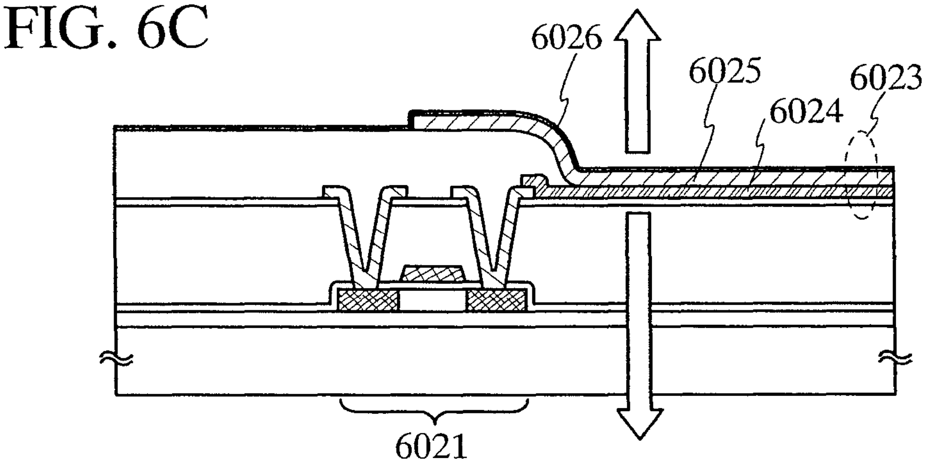

FIG. 6C is a sectional view of a pixel in which a TFT 6021 is a p-type and light emitted from a light emitting element 6023 is extracted from both a first electrode 6024 side and a second electrode 6026 side. The first electrode 6024 of the light emitting element 6023 is electrically connected to the TFT 6021 in FIG. 6C. On the first electrode 6024, an electroluminescent layer 6025 and the second electrode 6026 are stacked in this order.

The first electrode 6024 can be formed similarly to the first electrode 6004 shown in FIG. 6A while the second electrode 6026 can be formed similarly to the second electrode 6016 shown in FIG. 6B. The electroluminescent layer 6025 can be formed similarly to the electroluminescent layer 6005 shown in FIG. 6A.

In the pixel shown in FIG. 6C, light emitted from the light emitting element 6023 can be extracted from both the first electrode 6024 side and the second electrode 6026 side as shown by hollow arrows.

This embodiment mode can be freely combined with the above-described embodiment modes.

Embodiment Mode 8

In this embodiment mode, a sectional structure of a pixel in which a transistor for controlling current supply to a light emitting element is an n-channel TFT is described with reference to FIGS. 7A to 7C. Note that although a first electrode is a cathode while a second electrode is an anode in FIGS. 7A to 7C, it is possible that the first electrode is the anode while the second electrode is the cathode as well.

Figure 7A:
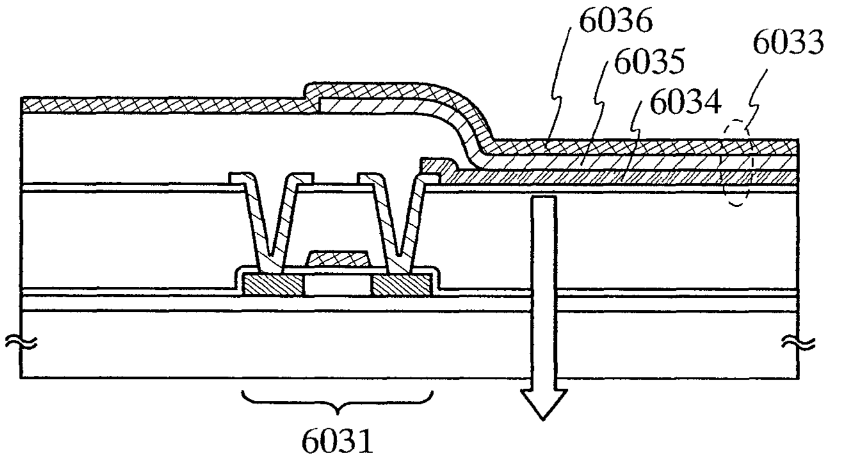
FIGS. 7A to 7C are cross-sectional views each showing a pixel structure of the invention.

FIG. 7A is a sectional view of a pixel in which a TFT 6031 is an n-type and light emitted from a light emitting element 6033 is extracted from a first electrode 6034 side. The first electrode 6034 of the light emitting element 6033 is electrically connected to the TFT 6031 in FIG. 7A. On the first electrode 6034, an electroluminescent layer 6035 and a second electrode 6036 are stacked in this order.

The first electrode 6034 is formed by using a material or with a thickness to transmit light, and can be formed by using a metal, an alloy, an electrically conductive compound each having a low work function, or a mixture of them. Specifically, an alkali metal such as Li and Cs, an alkaline earth metal such as Mg, Ca and Sr, an alloy containing such metals (Mg:Ag, Al:Li, Mg:In, or the like), a compound of such metals (calcium fluoride such as $CaF_2$ or calcium nitride such as $Ca_3N_2$), or a rare-earth metal such as Yb and Er can be employed. In the case where an electron injection layer is provided, a conductive layer such as an Al layer can be employed as well. Then, the first electrode 6034 is formed thick enough to transmit light (preferably about 5 to 30 nm). Furthermore, a light-transmissive conductive layer may be additionally formed using a light-transmissive conductive oxide so as to contact the top or bottom of the aforementioned conductive layer having a thickness enough to transmit light in order to suppress the sheet resistance of the first electrode 6034. Note that the first electrode 6034 may also be formed by using only a conductive layer employing a light-transmissive conductive oxide such as indium tin oxide (ITO), zinc oxide (ZnO), indium zinc oxide (IZO), and gallium-doped zinc oxide (GZO). Further alternatively, indium tin oxide containing silicon oxide (ITSO) or a mixture of indium oxide containing silicon oxide and 2 to 20 atomic % of zinc oxide (ZnO) may be employed; in the case of employing a light-transmissive conductive oxide, an electron injection layer is preferably provided in the electroluminescent layer 6035.

The second electrode 6036 is formed by using a material or with a thickness to reflect or shield light, and is formed by using a material suitable for being used as an anode. For example, the second electrode 6036 may be formed by using a single-layer film of one or more of TiN, ZrN, Ti, W, Ni, Pt, Cr, Ag, Al and the like, a stacked-layer structure of a titanium nitride film and a film mainly containing aluminum, a three-layer structure of a titanium nitride film, a film mainly containing aluminum and a titanium nitride film, or the like.

The electroluminescent layer 6035 can be formed similarly to the electroluminescent layer 6005 shown in FIG. 6A. When the electroluminescent layer 6035 has any of a hole injection layer, a hole transporting layer, an electron transporting layer and an electron injection layer in addition to a light emitting layer, the electron injection layer, the electron transporting layer, the light emitting layer, the hole transporting layer and the hole injection layer are stacked in this order on the first electrode 6034.

In the pixel shown in FIG. 7A, light emitted from the light emitting element 6033 can be extracted from the first electrode 6034 side as shown by a hollow arrow.

Figure 7B:
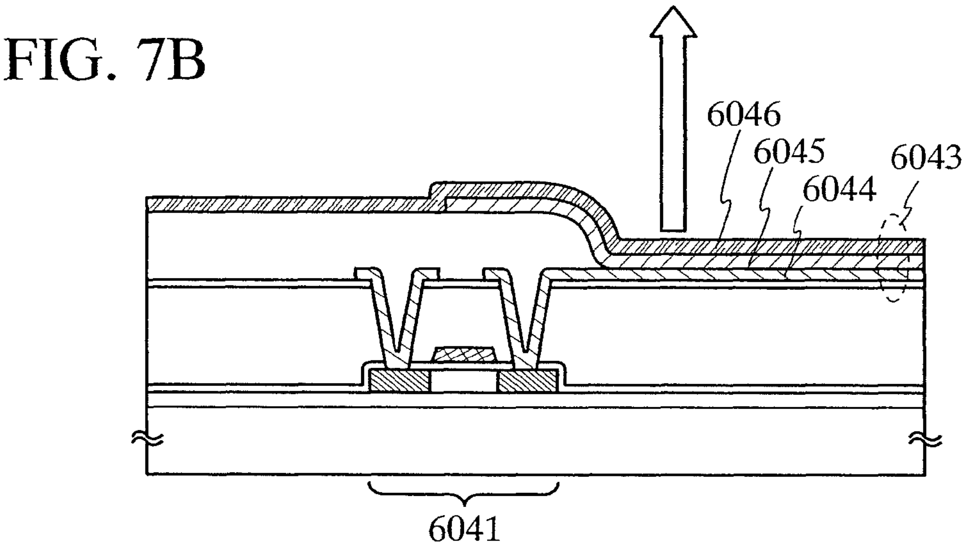

Next, FIG. 7B is a sectional view of a pixel in which a TFT 6041 is an n-type and light emitted from a light emitting element 6043 is extracted from a second electrode 6046 side. A first electrode 6044 of the light emitting element 6043 is electrically connected to the TFT 6041 in FIG. 7B. On the first electrode 6044, an electroluminescent layer 6045 and the second electrode 6046 are stacked in this order.

The first electrode 6044 is formed by using a material or with a thickness to reflect or shield light, and can be formed by using a metal, an alloy, an electrically conductive compound each having a low work function, or a mixture of them. Specifically, an alkali metal such as Li and Cs, an alkaline earth metal such as Mg, Ca and Sr, an alloy containing such metals (Mg:Ag, Al:Li, Mg:In, or the like), a compound of such metals (calcium fluoride such as $CaF_2$ or calcium nitride such as $Ca_3N_2$), a rare-earth metal such as Yb and Er, or the like can be employed. In the case where an electron injection layer is provided, a conductive layer such as an Al layer can be employed as well.

The second electrode 6046 is formed by using a material or with a thickness to transmit light, and by using a material suitable for being used as an anode. For example, the second electrode 6046 can be formed by using a light-transmissive conductive oxide such as indium tin oxide (ITO), zinc oxide (ZnO), indium zinc oxide (IZO), and gallium-doped zinc oxide (GZO). Alternatively, the second electrode 6046 may be formed by using indium tin oxide containing silicon oxide (ITSO) or a mixture of indium oxide containing silicon oxide and 2 to 20 atomic % of zinc oxide (ZnO). Further alternatively, other than the aforementioned light-transmissive conductive oxide, the second electrode 6046 may be formed by using, for example, a single-layer film of one or more of TiN, ZrN, Ti, W, Ni, Pt, Cr, Ag, Al and the like, a stacked-layer structure of a titanium nitride film and a film mainly containing aluminum, a three-layer structure of a titanium nitride film, a film mainly containing aluminum and a titanium nitride film, or the like; however, when employing a material other than the light-transmissive conductive oxide, the second electrode 6046 is formed thick enough to transmit light (preferably about 5 to 30 nm).

The electroluminescent layer 6045 can be formed similarly to the electroluminescent layer 6035 shown in FIG. 7A.

In the pixel shown in FIG. 7B, light emitted from the light emitting element 6043 can be extracted from the second electrode 6046 side as shown by a hollow arrow.

Figure 7C:
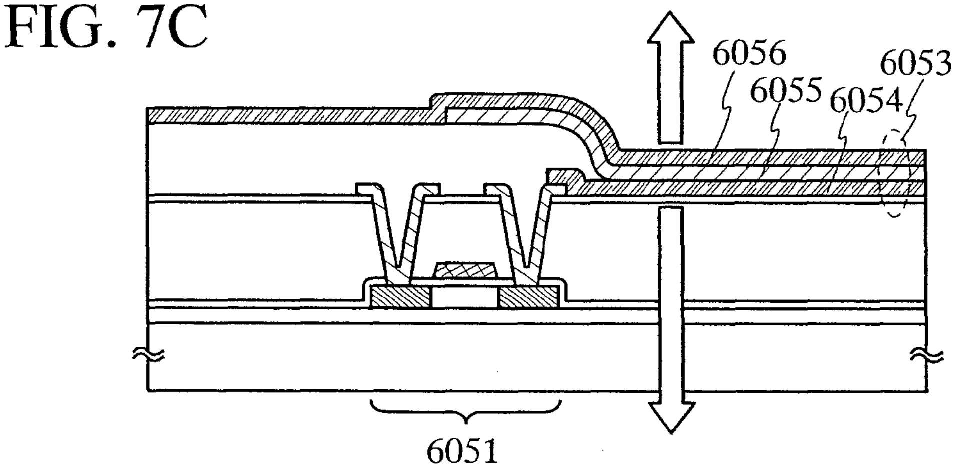

FIG. 7C is a sectional view of a pixel in which a TFT 6051 is an n-type and light emitted from a light emitting element 6053 is extracted from both a first electrode 6054 side and a second electrode 6056 side. The first electrode 6054 of the light emitting element 6053 is electrically connected to the TFT 6051 in FIG. 7C. On the first electrode 6054, an electroluminescent layer 6055 and the second electrode 6056 are stacked in this order.

The first electrode 6054 can be formed similarly to the first electrode 6034 shown in FIG. 7A while the second electrode 6056 can be formed similarly to the second electrode 6046 shown in FIG. 7B. The electroluminescent layer 6055 can be formed similarly to the electroluminescent layer 6035 shown in FIG. 7A.

In the pixel shown in FIG. 7C, light emitted from the light emitting element 6053 can be extracted from both the first electrode 6054 side and the second electrode 6056 side as shown by hollow arrows.

This embodiment mode can be freely combined with the above-described embodiment modes.

Embodiment Mode 9

Electronic apparatuses to which the light emitting device of the invention can be applied include a television apparatus (a television set or a television receiver), a camera such as a digital camera and a digital video camera, a mobile phone unit (a mobile phone), a portable information terminal such as a PDA, a portable game machine, a monitor, a computer, a sound reproducing device such as a car audio system, an image reproducing device equipped with a recording medium such as a home game machine, and the like. Specific examples thereof are described with reference to FIGS. 8A to 8F.

Figure 8A:
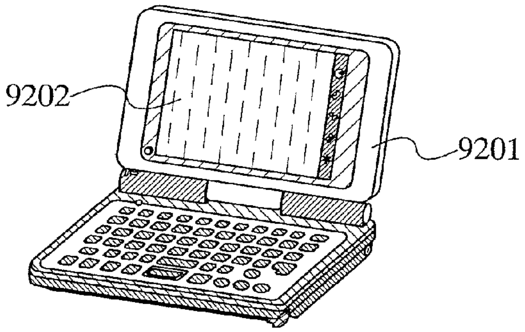
FIGS. 8A to 8F are views of electronic apparatuses of the invention.

FIG. 8A illustrates a portable information terminal applying the light emitting device of the invention, which includes a main body 9201, a display portion 9202, and the like. According to the invention, accurate gray scale display can be performed.

Figure 8B:
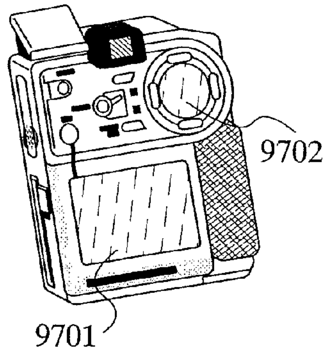

FIG. 8B illustrates a digital video camera applying the light emitting device of the invention, which includes display portions 9701 and 9702, and the like. According to the invention, accurate gray scale display can be performed.

Figure 8C:
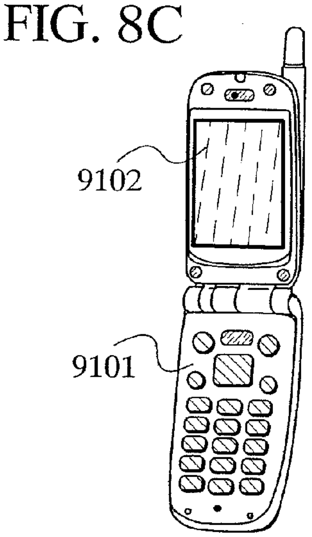

FIG. 8C illustrates a portable terminal applying the light emitting device of the invention, which includes a main body 9101, a display portion 9102, and the like. According to the invention, accurate gray scale display can be performed.

Figure 8D:
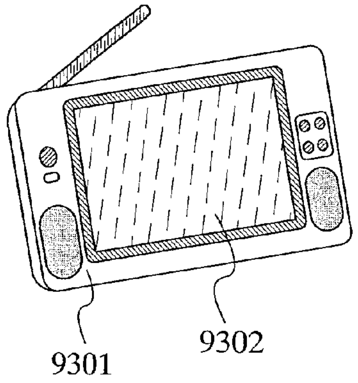

FIG. 8D illustrates a portable television apparatus applying the light emitting device of the invention, which includes a main body 9301, a display portion 9302, and the like. According to the invention, accurate gray scale display can be performed.

Figure 8E:
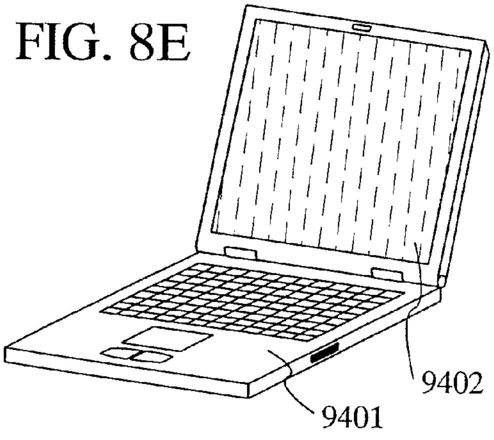

FIG. 8E illustrates a portable computer applying the light emitting device of the invention, which includes a main body 9401, a display portion 9402, and the like. According to the invention, accurate gray scale display can be performed.

Figure 8F:
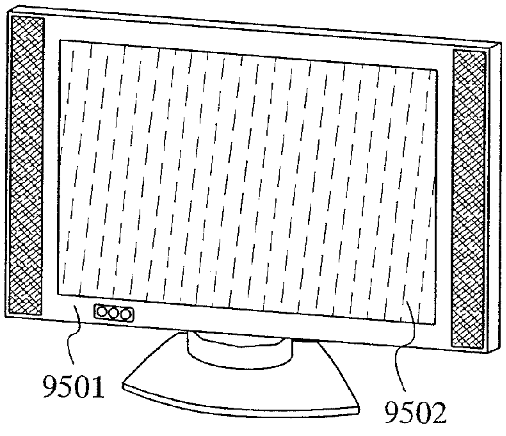
Figure 9:
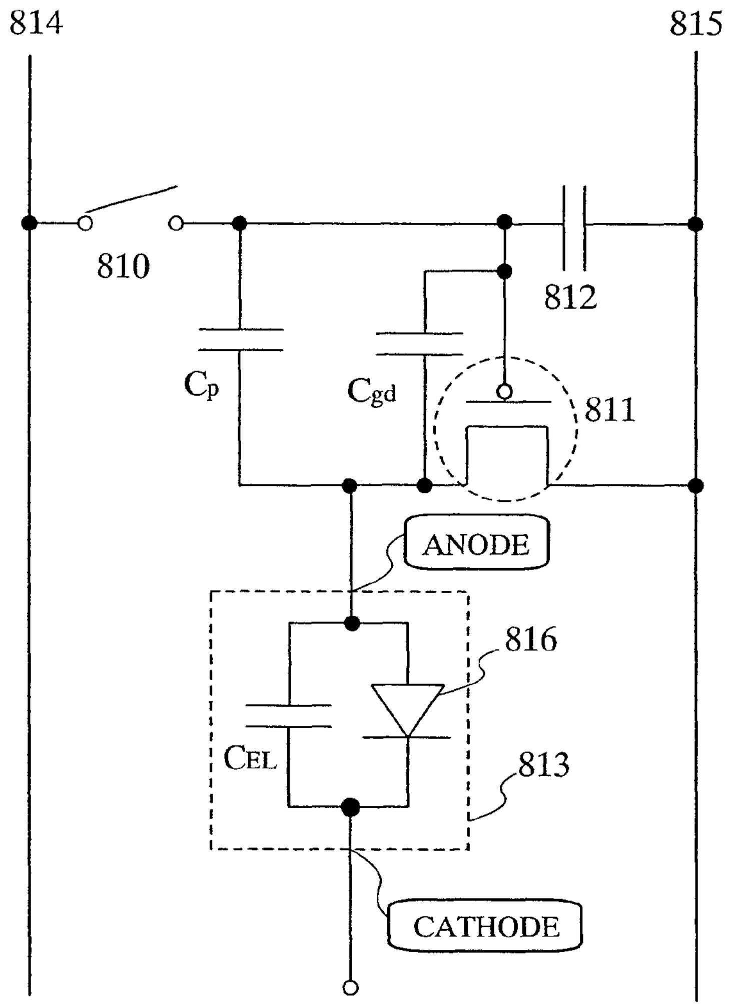
FIG. 9 (PRIOR ART)
FIG. 9 is a diagram showing a pixel configuration of a light emitting device.

FIG. 8F illustrates a television apparatus applying the light emitting device of the invention, which includes a main body 9501, a display portion 9502, and the like. According to the invention, accurate gray scale display can be performed.

As set forth above, the light emitting device of the invention can be applied to various electronic apparatus.

Embodiment

In this embodiment, a current of a cathode (a cathode current) of a light emitting element was measured where a voltage of an anode (an anode voltage) thereof was set at 8 V and the number of rows for full-white light emission with 1 bit was changed. Then, periods for inputting a signal into pixels of 320 rows (writing operation periods) were set at 1 μs, 500 ns, and 250 ns respectively, and the cathode current was compared in the respective periods between the case where an erasing signal was inputted only once (shown by a dotted line)

and the case where the erasing signal was inputted two times (shown by a full line, and the second input started with a delay of 20 rows).

Figure 10:
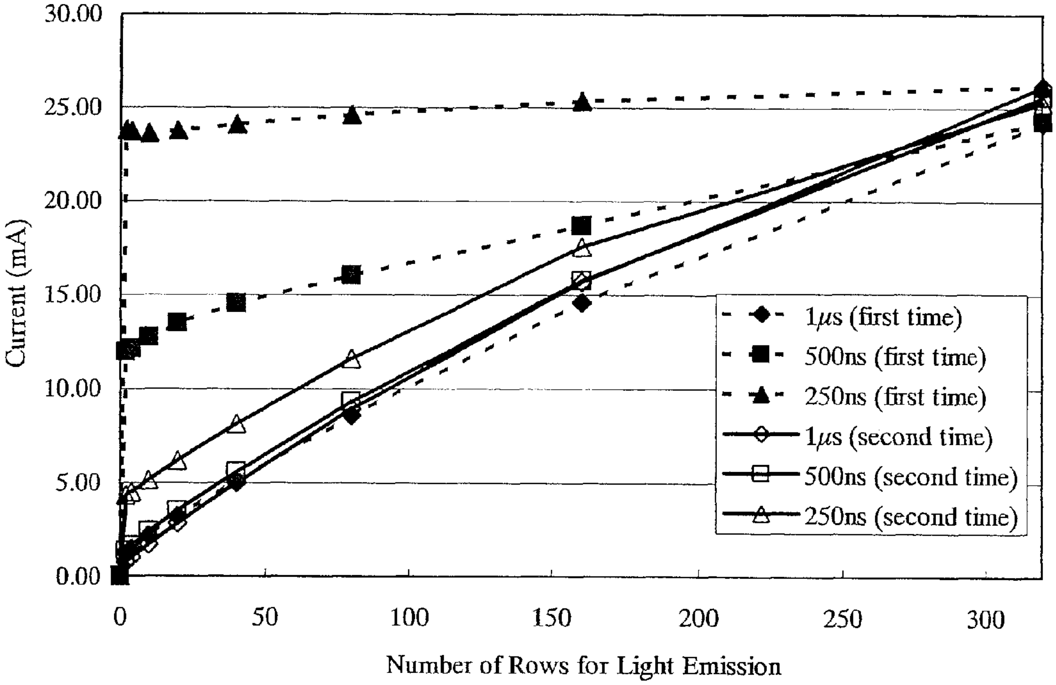
FIG. 10 is a graph showing experimental results of the invention.

In FIG. 10, the x-axis indicates the number of rows for light emission (320 rows) while the y-axis indicates the cathode current. It is ideal that the number of rows for light emission and the cathode current be proportionate to each other. However, in the case where an erasing signal is inputted only once, as the writing operation period is shorter, the cathode current at the small number of rows for light emission becomes larger as shown by the dotted lines; it means that low-gray scale display is not performed accurately. On the other hand, in the case where the erasing signal is inputted two times, the relationship between the number of rows for light emission and the cathode current is nearly an ideal proportional relationship as shown by the full lines.

As set forth above, in the case where the input of an erasing signal is small, namely in the case where the period for inputting an erasing signal is short, the capacitance holding a gate-source voltage of the driving transistor varies due to the capacitor ($C_{EL}$); and its effect is increased in particular when the writing operation period is short, and in addition, when the number of rows for light emission is small as well. Accordingly, as the writing operation period is shorter, a driving method for inputting an erasing signal two or more is more suitable.

This application is based on Japanese Patent Application serial no. 2004-278492 filed in Japan Patent Office on 24 Sep. 2004, and the entire contents of which are hereby incorporated by reference.

What is claimed is:

1. A driving method of a light emitting device comprising a first transistor, a second transistor, a wiring, and a light emitting element, wherein each of n subframe periods (n is a natural number equal to or more than two) comprises a writing operation period and a light emitting period following the writing operation period, wherein one of source and drain of the first transistor is electrically connected to the wiring and the other of source and drain of the first transistor is electrically connected to a gate of the second transistor, and wherein one of source and drain of the second transistor is electrically connected to the light emitting element, the driving method comprising the steps of:

inputting a first erasing signal to the gate of the second transistor in at least one of the n subframe periods; and inputting a second erasing signal to the gate of the second transistor in the at least one of the n subframe periods.

2. The driving method of a light emitting device according to claim 1, wherein lengths of the light emitting periods decrease with an increase in n.

3. The driving method of a light emitting device according to claim 1, wherein the one of the n subframe periods is the nth subframe period.

4. A driving method of a light emitting device comprising a switching transistor, a driving transistor, a signal line, a power supply line, a capacitor, and a light emitting element, wherein one of source and drain of the switching transistor is electrically connected to the signal line and the other of source and drain of the switching transistor is electrically connected to a gate of the driving transistor and one electrode of the capacitor, wherein one of source and drain of the driving transistor is electrically connected to the light emitting element, wherein the power supply line is electrically connected to the other electrode of the capacitor and the other of source and drain of the driving transistor, and wherein each of n subframe periods (n is a natural number equal to or more than two) comprises a writing operation period and a light emitting period following the writing operation period, the driving method comprising the steps of:

inputting a first erasing signal to the gate of the driving transistor in at least one of the n subframe periods; and inputting a second erasing signal to the gate of the driving transistor in the at least one of the n subframe periods.

5. The driving method of a light emitting device according to claim 4, wherein lengths of the light emitting periods decrease with an increase in n.

6. The driving method of a light emitting device according to claim 4, wherein the one of the n subframe periods is the nth subframe period.

7. A driving method of a light emitting device comprising a switching transistor, a driving transistor, a erasing transistor, a signal line, a power supply line, a capacitor, a first scan line, a second scan line, and a light emitting element, wherein one of source and drain of the switching transistor is electrically connected to the signal line and the other of source and drain of the switching transistor is electrically connected to a gate of the driving transistor, one electrode of the capacitor, and one of source and drain of the erasing transistor, wherein one of source and drain of the driving transistor is electrically connected to the light emitting element, wherein the power supply line is electrically connected to the other electrode of the capacitor, the other of source and drain of the driving transistor, the other of source and drain of the erasing transistor, wherein the first scan line is electrically connected to a gate of the switching transistor and the second scan line is electrically connected to a gate of the erasing transistor, and wherein each of n subframe periods (n is a natural number equal to or more than two) comprises a writing operation period and a light emitting period following the writing operation period, the driving method comprising the steps of:

inputting a first erasing signal to the gate of the driving transistor in at least one of the n subframe periods; and inputting a second erasing signal to the gate of the driving transistor in the at least one of the n subframe periods.

8. The driving method of a light emitting device according to claim 7, wherein lengths of the light emitting periods decrease with an increase in n.

9. The driving method of a light emitting device according to claim 7, wherein the one of the n subframe periods is the nth subframe period.

* * * * *